United States Patent [19]

Albrecht et al.

[11] 4,015,742
[45] Apr. 5, 1977

[54] ANCHORAGE OF A LINING IN A CAST IRON REACTOR PRESSURE VESSEL

[75] Inventors: Wolfgang Albrecht; Rolf Dörling, both of Gummersbach, Germany

[73] Assignee: L. & C. Steinmuller GmbH, Gummersbach, Germany

[22] Filed: Aug. 18, 1975

[21] Appl. No.: 605,264

[30] Foreign Application Priority Data

Aug. 19, 1974 Germany .......................... 2439706

[52] U.S. Cl. .................................. 220/9 A; 52/249; 220/15; 220/63 R
[51] Int. Cl.² .............. B65D 25/18; G21C/13/08
[58] Field of Search ............ 220/5 A, 9 A, 9 LG, 220/10, 15, 63 R, 3; 52/249; 176/87

[56] References Cited

UNITED STATES PATENTS

| 420,275 | 1/1890 | Keys | 220/5 A |
|---|---|---|---|
| 638,267 | 12/1899 | Norton | 52/249 X |
| 1,993,500 | 3/1935 | Benner | 220/15 |
| 2,955,415 | 10/1960 | Long | 220/15 X |
| 3,794,559 | 2/1974 | Davies et al. | 176/87 |
| 3,811,593 | 5/1974 | Bridges et al. | 220/15 X |

FOREIGN PATENTS OR APPLICATIONS

| 1,230,053 | 4/1971 | United Kingdom | 176/87 |

*Primary Examiner*—George E. Lowrance
*Assistant Examiner*—Stephen Marcus
*Attorney, Agent, or Firm*—Walter Becker

[57] ABSTRACT

A anchorage of a lining to a pressure vessel in which T-shaped anchors are connected to the lining. The anchors extend along the longitudinal axes of the cylindrical sections with which the linings are associated. The anchors extend into cutouts in these sections, with clearance provided around the anchors. The spaces between the anchors and the cutout, and between the pressure vessel and the lining, are filled, e.g. with concrete or a mixture of cement with steel balls.

3 Claims, 1 Drawing Figure

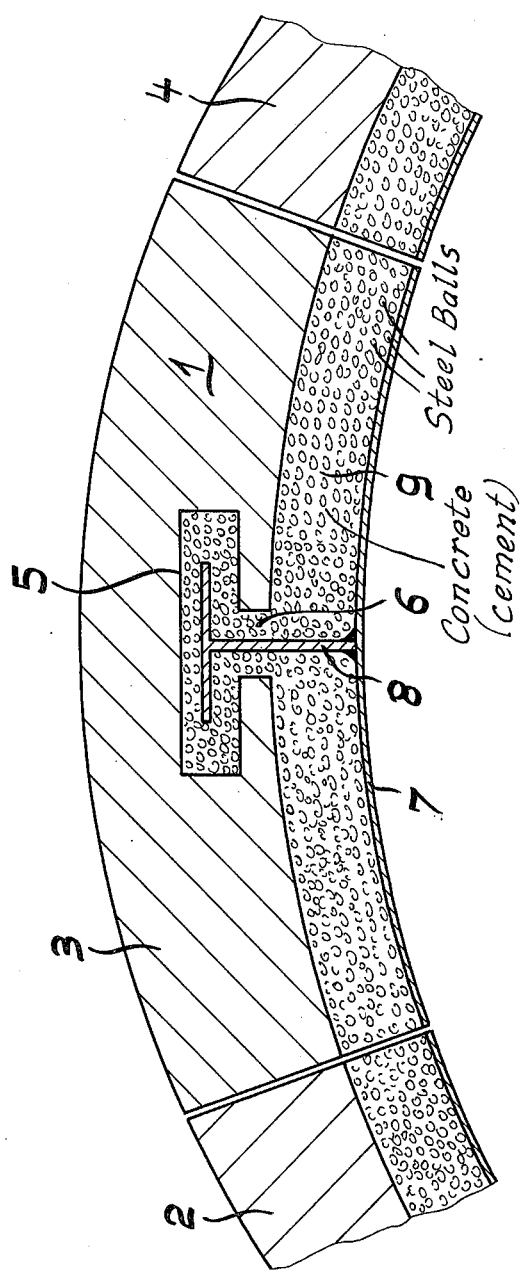

ANCHORAGE OF A LINING IN A CAST IRON REACTOR PRESSURE VESSEL

The present invention relates to the anchoring of the pressure-tight vessel (including lining), which vessel is composed of individual cylindrical sections, to a pressure container of a nuclear power station, which container is composed of individual cast iron segments.

The present invention is based on the known prestressed concrete reactor pressure vessels, which are connected to the lining by means of known anchoring elements, such as set bolts.

Furthermore, reactor pressure vessels of cast iron are known, according to which the lining and the pressure vessel or container form a unit. This solution makes the construction more expensive than the manufacture of conventional prestressed concrete reactor pressure vessels. The mounting or assembly of this known pressure vessel is more difficult, since no absolute sealing can be assured for every pressure and temperature. To solve this problem, the pressure vessel and lining are constructed and mounted separately.

It is an object of the present invention to produce a structurally simple anchoring of the lining to the segments of a cast iron reactor pressure vessel.

This object and other objects and advantages of the invention will appear more clearly from the following specification in connection with the accompanying drawing which shows a specific embodiment of anchoring the lining to the pressure vessel segments according to the present invention.

The present invention is characterized primarily in that T-shaped anchors are arranged on and connected to the outer surface of the individual sections of the lining so as to extend parallel to the longitudinal axis of the lining of the pressure vessel. The anchors are inserted into corresponding cutouts in the individual sections of the pressure vessel. The space between the anchor and cutout, and between the cast iron reactor pressure vessel and the lining is filled with, for example, concrete or a cement and steel ball mixture purposely for advantageous utilization of tolerances as well as for reducing the manufacturing and assembly costs.

One advantage of the arrangement according to the invention consists in that a greater division or path of the anchoring may be selected. It is an additional advantage that by purposely filling in the space between the lining and the cast iron reactor pressure vessel, tolerances can easily be taken advantage of or utilized. This results in substantially reducing the manufacturing and assembly costs.

Referring now to the drawing in detail, the cast iron reactor pressure vessel 1 comprises individual sections such as sections 2, 3 and 4. T-shaped cutouts 5 are arranged in these sections, the openings 6 of which extend to the center of the segment. The lining 7, on its outer surface and extending parallel to its longitudinal axis, has T-shaped anchors 8 which, with plenty of clearance, extend into the cutouts 5 of the cast iron reactor pressure vessel 1.

After the pressure vessel 1 and the lining have been mounted, the space 9 between the lining 7, the pressure vessel 1, the anchoring 8, and the cutouts or recesses 5 is filled with a filler. This filler may comprise a mixture of steel balls and concrete and the like for utilization of tolerances as well as for reducing the manufacturing and assembly costs of the cast iron reactor pressure vessel.

It is, of course, to be understood that the present invention is, by no means, limited to the specific showing of the drawing, but also comprises any modifications within the scope of the appended claims.

What we claim is:

1. In combination with a reactor pressure vessel of a nuclear power station having pressure-tight lining composed of individual cylindrical segments: a substantially cylindrical outer cast iron pressure container coaxially surrounding said lining in radially spaced relationship thereto, and composed of individual cast iron segments parallel to the longitudinal axis of said lining, each of said last mentioned segments having a recess, communicating with the space between said lining and said pressure container, a plurality of anchors of a T-shaped cross section respectively arranged in said recesses so that the stem and the transverse bar of said T-shaped cross section are spaced from the walls of the respective recess and the stem of said T-shaped cross section engages the respective adjacent cylindrical segment of said lining and is connected thereto, said anchors being substantially parallel to the longitudinal axis of said lining, and filler material filling the space between said lining and said container and completely surrounding said T-shaped anchors to fill the spaces in said recesses.

2. An arrangement in combination according to claim 1, in which said filler material comprises concrete.

3. An arrangement in combination according to claim 1, in which said filler material comprises a mixture of cement and steel balls.

* * * * *